United States Patent [19]

Sweeney

[11] Patent Number: 4,477,905
[45] Date of Patent: Oct. 16, 1984

[54] SHORT PULSE LASER

[75] Inventor: Harold E. Sweeney, Menlo Park, Calif.

[73] Assignee: GTE Products Corporation, Stamford, Conn.

[21] Appl. No.: 432,847

[22] Filed: Oct. 5, 1982

[51] Int. Cl.³ ................................................ H01S 3/10
[52] U.S. Cl. ........................................ 372/25; 372/9; 372/30; 350/393; 350/386
[58] Field of Search ........................ 372/25, 19, 26, 27, 372/12, 29, 309, 33, 87, 9; 350/393, 386, 392

[56] References Cited

PUBLICATIONS

Mourou et al.; "High-Power Switching with Picosecond Precision", Appl. Phys. Lett. 35 (7), Oct. 1, 1979.
Lee; "Picosecond Optoelectronic Switching in GaAs"; Appl. Phys. Lett. vol. 30, No. 2, Jan 15, 1977.
LeFur et al.; "A Kilovolt Picosecond Optoelectronic Switch and Pockel's Cell"; Appl. Phys. Lett. vol. 28, No. 1, Jan. 1, 1976.
Feldman; "Ultralinear Bistable Electro-Optic Polarization Modulator," Appl. Phys. Lett. 33 (3), Aug. 1, 1978.
Agostinelli et al.; "Active Pulse Shaping in the Picosecond Domain"; Appl. Phys. Lett. 35 (10), Nov. 15, 1979.

*Primary Examiner*—William L. Sikes
*Assistant Examiner*—Léon Scott, Jr.
*Attorney, Agent, or Firm*—John F. Lawler

[57] ABSTRACT

The width of the output pulse of a Q-switched cavity dump laser is substantially reduced by rapidly discharging a high voltage across the cavity dump crystal with an electro-optical switch which is closed by regenerative feedback from the optical output of the laser. The switch comprises a semiconductor body in intimate contact with the cavity dump crystal and has electrodes spaced by a small gap which control discharge of the high voltage across the crystal. A small fraction of the laser output is fed back to the switch and regeneratively creates a d-c current in the semiconductor body across the gap to accelerate closure of the switch and discharge of the voltage across the crystal to produce an extremely narrow output pulse.

4 Claims, 4 Drawing Figures

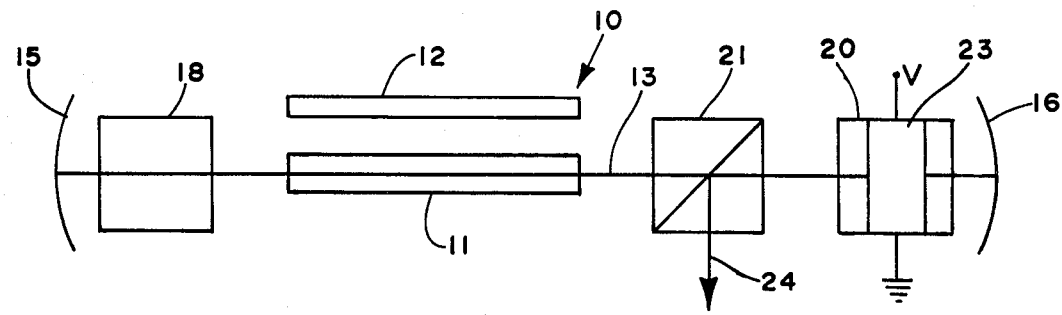
FIG. 1
PRIOR ART
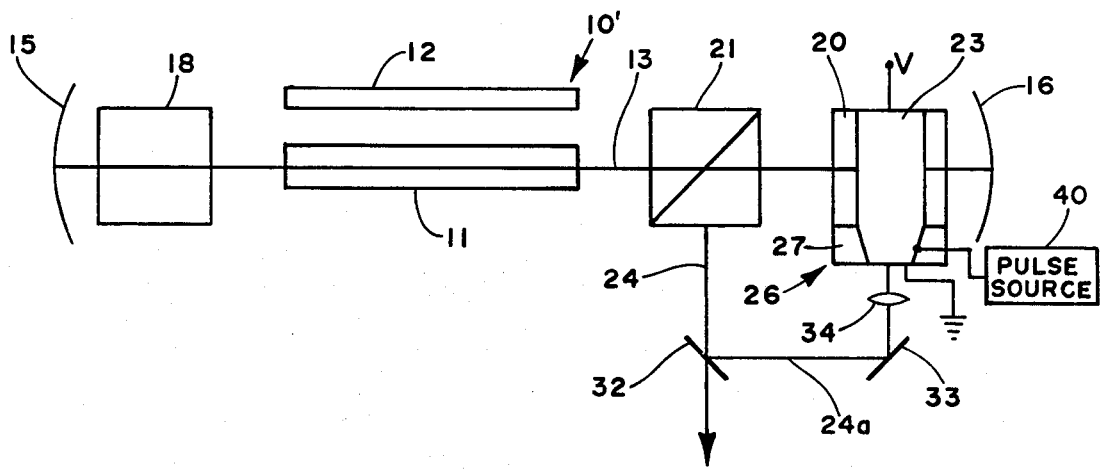
FIG. 2
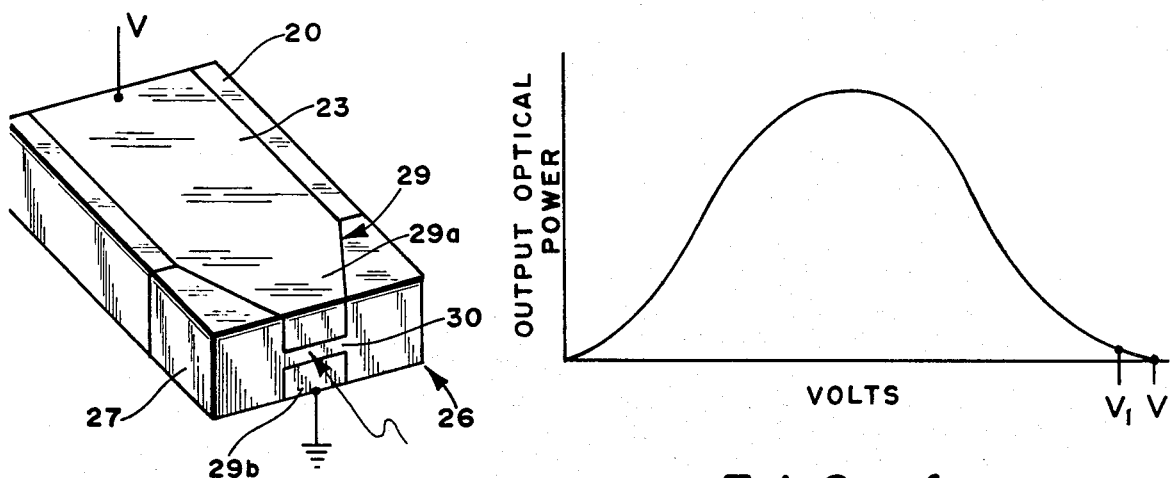
FIG. 3
FIG. 4

SHORT PULSE LASER

BACKGROUND OF THE INVENTION

This invention relates to lasers and more particularly an improved short pulse laser.

Optical ranging systems operative between the earth and satellites require narrow output pulses from laser transmitters in order to provide the desired ranging accuracy. Such ranging systems may be used, for example, to detect and measure movements of the earth's crust on opposite sides of an earthquake fault. It is desirable that the laser apparatus used in such a laser ranging system be relatively compact to enable direct attachment thereof to the transmitter head and thereby avoid Coude' path optics and design required for a remotely located laser.

A prior laser design utilizes a polarization analyzer and a cavity dump crystal in a Q-switched laser cavity, the crystal being biased at 5–7 kV which is discharged rapidly to divert the light beam from the laser cavity. More specifically, as the biasing voltage rapidly decreases across the dump crystal, an output pulse is generated by the polarization analyzer, the width of the pulse being directly proportional to the rate of change of voltage on the crystal. In order to provide the desired short pulse, the rate of change of voltage must exceed $10^{12}$ volts per second. Since this rate of change exceeds that obtainable with semiconductor devices, gas and spark gap switches are the only known devices capable of operating at the necessary voltage rate. Such switches are relatively bulky and costly compared to semiconductor devices and in addition require that the laser be remote from the transmitter head in a laser ranging system.

In one prior art optically triggered solid state switch, trigger photons are absorbed at the active region of a semiconductor body and generate therein charge carriers which rapidly create a direct current to close the switch. This switch is described in an article entitled "High-Power Switching With Picosecond Precision" by Mourou and Knox, Applied Physics Letters, 35 (7) Oct. 1979, pages 492–495. This optical switch utilizes both silicon and gallium arsenide, and is reported to have operated at switching speeds of $6 \times 10^{13}$ to $10^{14}$ volts per second with a holdoff voltage of 5 to 8 kV. In order to use such a switch efficiently, however, it is necessary to have an equally short optical pulse for a trigger. Although such a source exists, it is complex and inconvenient. Further, its use would obviate the need for the laser itself.

OBJECTS AND SUMMARY OF THE INVENTION

A general object of the invention is the provision of a Q-switched pulsed laser system capable of producing an output pulse having a width in the order of 200 to 300 picoseconds.

This and other objects of the invention are achieved with a Q-switched cavity dump laser having an electro-optical solid state switch for discharging the high voltage across the cavity dump crystal, the switch being regeneratively actuated through feedback of part of the laser output for accelerating the discharge of the voltage.

DESCRIPTION OF THE DRAWINGS

FIG. 1 is a schematic block diagram of a prior art cavity dump laser.

FIG. 2 is the block diagram of FIG. 1 modified in accordance with this invention.

FIG. 3 is an enlarged perspective view of the cavity dump crystal and optical switch used in the practice of the invention.

FIG. 4 is a curve showing the relationship between voltage applied to the cavity dump crystal and the magnitude of output power from the laser.

DESCRIPTION OF PREFERRED EMBODIMENT

Referring now to the drawings, FIG. 1 shows a prior art cavity dump laser 10 comprising a lasing medium 11, such as a Nd:YAG rod, which is pumped by lamp 12 and generates a laser beam 13 in the laser cavity defined by totally reflecting mirrors 15 and 16 spaced from opposite ends, respectively, of rod 11. A Q-switch 18 is disposed in the cavity and operates in the well-known manner to cause the laser to operate in a pulsed mode.

Disposed in the laser cavity between rod 11 and mirror 16 is a cavity-dump (C-D) crystal 20 such as lithium niobate or potassium dideuterium phosphate (KD*P), and a polarization analyzer 21 such as a Glan-thompson prism or dielectric film polarizer which together are aligned with and traversed by laser beam 13. Crystal 20 has an electrode 23 such as a conductive film or paint by means of which high voltage (5–10 kV) from a source V is applied to the crystal. When this voltage is discharged through electrode 23 across crystal 20, the polarization of beam 13 momentarily changes and causes analyzer 21 to divert a substantial part of the beam from the cavity as an output 24 in the form of a pulse. The relationship of voltage across C-D crystal 20 and the power of laser output pulse 24 is shown in FIG. 4 and resembles a sine wave on a pedestal.

The foregoing cavity dump laser is well-known in the art and does not per se constitute this invention.

Laser 10' embodying this invention is shown in FIG. 2 and has several components substantially identical to those described above, like reference characters indicating like parts on the drawings. In accordance with this invention, discharge of the high voltage V across crystal 20 is controlled by an electro-optical switch 26 which is regeneratively actuated by a portion 24a of output pulse 24. Switch 26 comprises a block 27 of a suitable semiconductor material having an electrode 29 with a first part 29a and a second part 29b separated by a small gap 30 in the order of a few millimeters wide. For a laser having a wavelength of 1.06µ, for example, a suitable semiconductor material for this purpose is silicon or gallium arsenide doped with chromium. Electrode part 29a is electrically connected to electrode 23 and preferably is an extension thereof as shown in FIG. 3; electrode part 29b is connected to the other side of the voltage discharge circuit such as electrical ground as shown. Semiconductor block 27 is disposed in intimate contact with crystal 20 in order to minimize interelement capacitance, parasitic inductance, and the corresponding delay in operating the switch.

The regenerative feedback circuit comprises a partially reflective mirror 32 aligned with output pulse 24 from analyzer 21, a totally reflective mirror 33 and a focusing lens 34 between mirror 33 and block 27. Mirror 32 preferably reflects approximately 1% of the output power from analyzer 21 with 99% passing through as useful output power.

The operation of the switch 26 in producing a short output pulse from the laser is now described with reference to the voltage-power curve of FIG. 4. Assume that rod 11 has been pumped by lamp 12 to a high energy level, that Q-switch 18 is closed causing optical energy to circulate in the laser cavity, that voltage V is applied to crystal 20 by electrodes, 29a and 29b, and that the electro-optical switch 26 is open, i.e., is nonconducting. With these conditions existing, closure of switch 26 is initiated by slightly reducing voltage V to $V_1$ by coupling a negative-going pulse of about 100 volts to electrode 29a from a suitable source 40, causing crystal 20 and analyzer 21 to produce a small amount of optical output power. A portion of this output power is fed back via mirrors 32 and 33 and lens 34 to the semiconductor body 27 at electrode gap 30, so that the photons generate electrons (direct current) in the body across electrodes 29a and 29b and begin to close the switch. This increases the voltage discharge across crystal 20 which in turn produces greater power output from analyzer 21 and feeds back more optical energy to switch 26 to regeneratively accelerate closure of the switch. As a result, the bias voltage discharges rapidly and produces an extremely narrow output pulse, in the order of 250 picoseconds.

The advantages of the invention are the elimination of all external fast switching electronics, reduction of parasitic capacitance and inductance and minimizing of required switching energy as a result of intimate electrical contact of the switch body with the C-D crystal, and the minimal size and weight of the switch package.

What is claimed is:

1. In a laser system comprising a lasing medium, means to pump said medium to produce a laser beam, reflective means spaced from opposite ends of said medium defining the laser cavity, a Q-switch and a polarization analyzer and an electrooptical cavity dump crystal disposed in said cavity, said crystal having an electrode thereon, and means to apply a voltage to said electrode, the improvement of means to discharge said voltage across said crystal to change the polarization of said laser beam and cause said analyzer to direct said beam as an output pulse from said cavity, comprising
    a semiconductor body adjacent to said crystal and having an electrode connected to said crystal electrode,
    said body electrode having first and second parts separated by a gap, and
    a negative-pulse means causing said crystal and said analyzer to direct part of said output beam against said semiconductor body at said gap to generate electrons in said semiconductor body and electrically connect said electrode parts together to regeneratively accelerate discharge of said voltage across said crystal and produce a narrow output pulse.

2. The system according to claim 1 wherein said means to cause said analyzer to direct part of said output pulse against said semiconductor body at said gap to rapidly close the switch and discharge said voltage across to said crystal, comprises a partially reflective element aligned with the output beam; said partially reflective element is characterized by an approximately 1% reflective and 99% transmissive capability.

3. In a laser having a lasing medium and a cavity, means to energize said medium to produce a laser beam, said cavity having a Q-switch and a polarization analyzer and a cavity dump crystal disposed therein, a source of high voltage, and means to apply said voltage to said crystal to change the polarization of said beam and cause said analyzer to direct said beam out of said cavity as an output pulse, the method of decreasing the width of the output pulse, consisting of the steps of
    decreasing said voltage slightly and causing said analyzer to divert part of said beam out of said cavity as an output, and
    feeding part of said output back to an optical switch controlling the discharge of said voltage across said crystal for closing the switch rapidly and producing a narrow output pulse.

4. The method according to claim 3 in which approximately 1% of said output is fed back to said switch.

* * * * *